Patented Jan. 2, 1945

2,366,402

UNITED STATES PATENT OFFICE 2,366,402

NEGATIVE ELECTRODE FOR CADMIUM-NICKEL STORAGE BATTERIES AND PROCESS OF PRODUCING THE SAME

Anna P. Hauel, Lancaster, N. Y.

Application July 10, 1941, Serial No. 401,766

17 Claims. (Cl. 136—24)

The present application is a continuation in part of my prior U. S. Patent No. 2,254,286, entitled "Electrodes," patented September 2, 1941.

My present invention relates to a process of preparing an active mass for electrodes of cadmium-nickel storage batteries and to negative electrodes produced by this process.

It is an object of my invention to improve the active mass for such negative electrodes.

A further object of my invention is to produce an active mass containing cadmium hydroxide and cadmium oxide which are more active than the cadmium compounds now in use.

Still a further object of my invention is to prepare these cadmium hydroxide and cadmium oxide by a process which gives the thus prepared cadmium particles an especially great active surface.

In order to achieve the above objects, I propose to use as active mass for negative electrodes of cadmium nickel storage batteries cadmium oxide or cadmium hydroxide formed by anodic oxidation of metallic cadmium. Preferably, the anodic oxidation is carried out in an electrolyte consisting of an aqueous solution of at least one substance selected from the group consisting of water soluble salts of alkali metals and the hydroxides of such alkali metals.

In accordance with a preferred embodiment of my invention, the cadmium oxide or cadmium hydroxide is prepared by anodic oxidation of metallic cadmium containing anodes in an electrolyte of the above described type. When producing the cadmium oxide or cadmium hydroxide as described above, it is, of course, not important how many cadmium anodes are subjected to anodic oxidation, and whether the oxidation is carried out by means of continuous or interrupted or reversed current. Sometimes it may be advantageous to change the current direction during the electrolysis, particularly when all the electrodes immersed in the electrolyte consist of cadmium.

Figure 2:
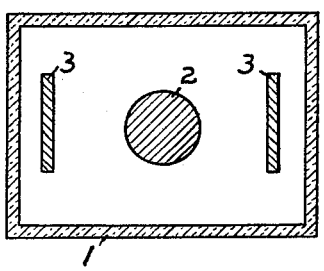
Figure 4:
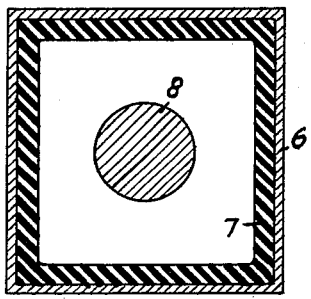
Figure 1:
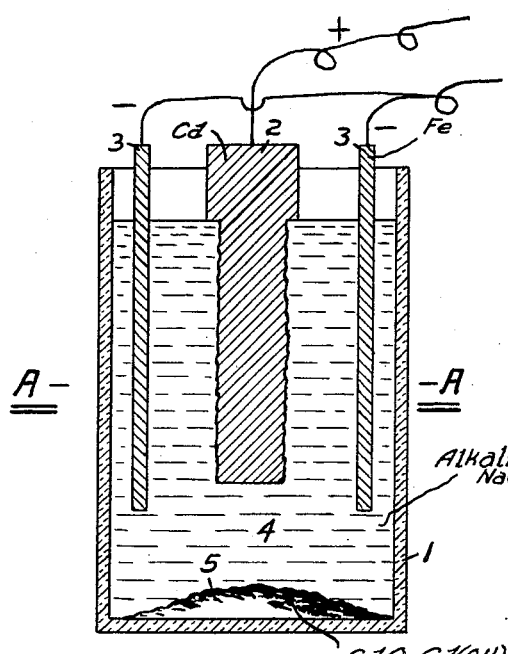
Figure 3:
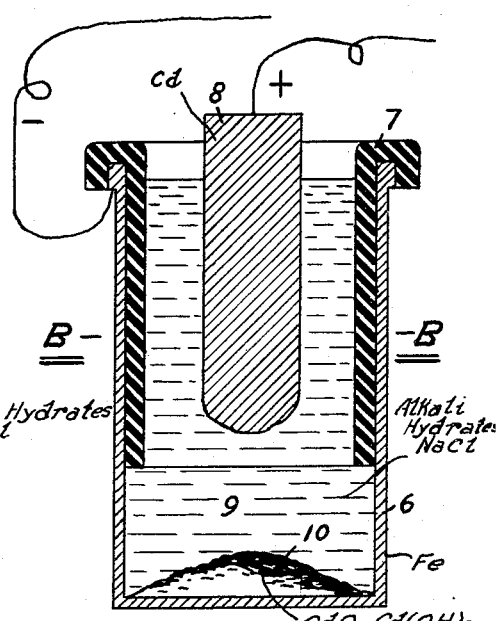

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figs. 1 and 2 are a longitudinal and a cross-section of an electrolyzing apparatus for preparing the active mass in accordance with my present invention; and Figs. 3 and 4 are a longitudinal and a cross-section of another embodiment of the electrolyzing apparatus, shown in Figs. 1 and 2.

The electrolyzing apparatus shown in Figs. 1 and 2 consists of a container 1 preferably of glass or other nonconductive material containing the electrolyte 4. The cadmium anode 2 has the shape of a rod and is vertically suspended in the electrolyte; the iron cathodes 3 are also suspended, preferably vertically, as shown. In carrying out the process according to my invention, the anode corrodes, as shown on that part of its surface which is immersing in the electrolyte, and by this corrosion and oxidation the cadmium hydroxide and oxide 5 is sinking down and is dropping on the bottom of the container 1 in which the electrolysis is carried out. Thus, the cadmium oxide and cadmium hydroxide 5 formed by anodic oxidation may be easily collected and subjected to further treatment before being filled into the electrode pockets of the batteries.

The electrolyzing apparatus shown in Figs. 3 and 4 consists of an iron container 6 in which is carried out the anodic oxidation. This container 6 contains the electrolyte 9 in which immerses the cadmium anode 8, and has insulated, preferably hard rubber plated walls 7; only the container bottom is exposed to the electrolyte 9 and used as cathode in the electrolyzing process. On the anode 8, especially on its lower end, cadmium hydroxide is formed which sinks as a precipitate 10 in the electrolyte and drops on the bottom of the container 6. Thereby hydrogen is formed on the cathode which rises in the electrolyte and continuously mixes this electrolyte. Thereby a part of the cadmium hydroxide 10 covering the cathode is reduced to metallic cadmium. This metallic cadmium-cadmium hydroxide mixture is thereafter separated from the electrolyte 9. This latter process not only saves current during formation of the cadmium oxide or cadmium hydroxide but the cadmium compounds reduced on the container bottom serving as cathode form an extremely finely divided sponge-like metallic powder. This metallic cadmium powder can be used with or without admixture of cadmium oxide or cadmium hydroxide as active mass for negative electrodes.

In order to increase the electric conductivity of the active mass, I further propose to add to the cadmium oxide or cadmium hydroxide formed by anodic oxidation before filling the same into the electrode pockets, about 1–30 per cent of a finely divided conductive substance adapted to increase the conductivity of the cadmium oxide or cadmium hydroxide. I prefer to use as such conductive material flaky graphite, finely divided metallic iron or the like.

The dry cadmium hydroxide powder thus produced is very bulky and has a cube weight of about less than one, i. e., the weight of one cubic centimeter of loose powder is less than one gramme. In order to increase the cube weight, I propose to compress the cadmium powder at least once under high pressure and to pulverize it thereafter. This may be carried out after the cadmium compound has been formed, washed, dried and ground. It is of advantage to wet the cadmium compound after grinding, preferably with caustic sodium solution.

The following examples illustrate my invention but they are not intended to limit it thereto.

1. In an electrolyzing apparatus of the type shown in Figs. 1 and 2, cadmium hydroxide and cadmium oxide is formed by oxidation of the anodes containing metallic cadmium. A cadmium bar 2 of about five centimetres' diameter is preferably used as anode. This cadmium bar is preferably vertically suspended and immersed in the electrolyte. Two iron sheet plates 3 may be used as cathodes. The anode 2 and the cathodes 3 immerse to about 20 centimetres in the electrolyte 4.

The electrolyte is produced by dissolving caustic potash (KOH) in water in a proportion of 21% caustic potash to the water. About 2.5 litres of said electrolyte are used at once in the electrolyzing vessel.

By electrolyzing, the anode 2 oxidizes and corrodes, forming thereby cadmium hydroxide $Cd(OH)_2$ as a precipitate 5. This cadmium hydroxide sinks in the electrolyte 4 to the bottom of the container 1 in which the electrolysis is carried out; thereafter, it is separated from the electrolyte 4, washed, and dried.

The dry cadmium hydroxide powder produced by anodic oxidation is, however, very bulky and has a cube weight of less than one, i. e., the weight of one cubic centimetre of powder is less than one gramme. Furthermore, this cadmium hydroxide has the disadvantage of being very sticky and not adapted to be filled without further treatment into the pockets of electrode plates. I propose therefore to reduce the cube weight of the cadmium hydroxide in the following way:

The cadmium hydroxide 5 produced by the electrolysis is washed, dried, and thereafter wetted with a caustic sodium solution, run through between two, preferably horizontally arranged rolls and thereby compressed. The compressing process may be repeated several times. Thereafter the compressed cadmium hydroxide is finely ground. The cadmium hydroxide powder thus produced is not bulky and has a cube weight of about 1.6; furthermore, it is not sticky and may be filled easier into the electrode pockets.

2. In the electrolyzing apparatus shown in Figs. 3 and 4, also a cadmium bar 8 of about five centimetres' diameter is used as anode; this anode is vertically suspended and is immersed in the electrolyte 9. The electrolyte container 6 has insulated, preferably hard rubber plated walls 7, and only the bottom of the container is exposed to the electrolyte and consists of a conducting material, preferably of iron. This bottom is used as cathode in the electrolyzing process.

A solution of 400 grams sodium chloride in two litres of water is used as electrolyte. During the electrolysis the electrolyte is heated through the bottom of the container to a temperature of about 80° C. On the anode 8 cadmium hydroxide is formed, which sinks as a precipitate through the electrolyte to the container bottom serving as cathode. Thereby hydrogen is formed on the container bottom which rises in the electrolyte, continuously mixing it up. A part of the cadmium hydroxide 9 covering the container bottom is thereby reduced to metallic cadmium powder. This metallic cadmium-cadmium hydroxide mixture is separated from the electrolyte and treated as described above in Example 1.

3. I also may use other electrolyte solutions instead of the electrolytes described above: thus, for instance, I may use an aqueous solution of sodium hydroxide heated to about 30–50° C. as electrolyte; I may also use a substantially saturated sodium chloride solution and heat the same to about 80–100° C. Good results have also been obtained with an electrolyte consisting of an aqueous solution of sodium hydroxide and sodium chloride, heated to about 40–50° C.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

I claim:

1. In a process of preparing an active mass for the electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of an aqueous solution of a caustic alkali.

2. Process of preparing a powdery active mass for the electrodes of cadmium nickel storage batteries, comprising the step of forming a powdery substance of the group consisting of cadmium hydroxide and cadmium oxide by anodic oxidation of an anode consisting exclusively of metallic cadmium in an electrolyte consisting exclusively of an aqueous solution of at least one substance selected from the group consisting of water soluble salts of alkali metals and hydroxides of alkali metals.

3. In a process of preparing an active mass for electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of an aqueous solution of sodium hydroxide.

4. In a process of preparing an active mass for electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of an aqueous solution of sodium hydroxide heated to a temperature of 30 to 50° C.

5. In a process of preparing an active mass for electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of an aqueous solution of sodium chloride and sodium hydroxide.

6. In a process of preparing an active mass for electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of an aqueous solution of sodium chloride and sodium hydroxide heated to a temperture of 40 to 50° C.

7. In a process of preparing an active mass for electrodes of cadmium nickel storage batteries, the step of forming a powdery substance of the group consisting of cadmium hydroxide and cadmium oxide by anodic oxidation of a substantially vertically arranged anode consisting of metallic cadmium in an electrolyte consisting exclusively of an aqueous solution of at least one substance selected from the group consisting of water soluble salts of alkali metals and hydroxides of alkali metals, the cadmium oxide and cadmium hydroxide particles formed by said anodic oxidation sinking in said electrolyte onto a cathode arranged horizontally under said vertical anodes, causing thereby the cadmium hydroxide and cadmium oxide formed by anodic oxidation of said vertical anodes to be reduced to a finely divided sponge-like metallic cadmium powder while in contact with said cathode.

8. In a process of preparing an active mass for electrodes of cadmium nickel storage batteries, the steps of forming a powdery substance of the group consisting of cadmium hydroxide and cadmium oxide by anodic oxidation of an anode consisting exclusively of metallic cadmium in an electrolyte consisting exclusively of an aqueous solution of at least one substance selected from the group consisting of water soluble salts of alkali metals and hydroxides of alkali metals, and thoroughly mixing said substance with about 1 to 30 per cent of a finely divided conductive substance adapted to increase the electric conductivity of cadmium oxide and cadmium hydroxide formed by anodic oxidation.

9. In a process of preparing an active mass for electrodes of cadmium nickel storage batteries, the steps of forming a powdery substance of the group consisting of cadmium hydroxide and cadmium oxide by anodic oxidation of an anode consisting exclusively of metallic cadmium in an electrolyte consisting exclusively of an aqueous solution of at least one substance selected from the group consisting of water soluble salts of alkali metals and hydroxides of alkali metals, and thoroughly mixing said substance with about 1 to 30 per cent of flaky graphite adapted to increase the electric conductivity of cadmium oxide and cadmium hydroxide formed by anodic oxidation.

10. In a process of preparing an active mass for electrodes of cadmium nickel storage batteries, the steps of forming a powdery substance of the group consisting of cadmium hydroxide and cadmium oxide by anodic oxidation of an anode consisting of metallic cadmium exclusively in an electrolyte consisting exclusively of an aqueous solution of at least one substance selected from the group consisting of water soluble salts of alkali metals and hydroxides of alkali metals, and thoroughly mixing said substance with about 1 to 30 per cent of finely divided metallic iron adapted to increase the electric conductivity of cadmium oxide and cadmium hydroxide formed by anodic oxidation.

11. A process of preparing an active mass for electrodes of cadmium nickel storage batteries, the steps of forming a powdery substance of the group consisting of cadmium hydroxide and cadmium oxide by anodic oxidation of an anode consisting exclusively of cadmium in an electrolyte consisting exclusively of an aqueous solution of water soluble salts of alkali metals and the hydroxides of alkali metals, compressing the thus formed finely divided active cadmium hydroxide and cadmium oxide, and pulverizing it thereafter.

12. A process of preparing an active mass for electrodes of cadmium nickel storage batteries, the steps of forming a powdery substance of the group consisting of cadmium hydroxide and cadmium oxide by anodic oxidation of an anode consisting exclusively of cadmium in an electrolyte consisting exclusively of an aqueous solution of water soluble salts of alkali metals and the hydroxides of alkali metals, washing, drying and grinding said substance, wetting it, compressing it at least once under high pressure, and pulverizing it thereafter.

13. A process of preparing an active mass for electrodes of cadmium nickel storage batteries, the steps of forming a powdery substance of the group consisting of cadmium hydroxide and cadmium oxide by anodic oxidation of an anode consisting exclusively of cadmium in an electrolyte consisting exclusively of an aqueous solution of water soluble salts of alkali metals and the hydroxides of alkali metals, washing, drying and grinding said substance, wetting it, compressing it at least once under high pressure, and pulverizing it thereafter.

14. A negative electrode for cadmium nickel storage batteries containing as active mass a powdery substance selected from the group consisting of cadmium oxide and cadmium hydroxide formed by anodic oxidation of an anode consisting exclusively of cadmium in an electrolyte consisting exclusively of an aqueous solution of at least one substance selected from the group consisting of water soluble salts of alkali metals and hydroxides of alkali metals.

15. In a process of preparing an active mass for electrodes of cadmium nickel storage batteries, the step of forming a powdery substance of the group consisting of cadmium hydroxide and cadmium oxide by anodic oxidation of anode consisting exclusively of metallic cadmium in an electrolyte consisting exclusively of an aqueous solution of at least one substance selected from the group consisting of water soluble salts of alkali metals and hydroxides of alkali metals.

16. In a process of preparing an active mass for electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of a substantially saturated sodium chloride solution.

17. In a process of preparing an active mass for electrodes of cadmium nickel storage batteries, the step of forming a powdery substance of the group consisting of cadmium hydroxide and cadmium oxide by anodic oxidation of an anode consisting exclusively of metallic cadmium in an electrolyte consisting exclusively of a substantially saturated chloride solution heated to a temperature of 80 to 100° C.

ANNA P. HAUEL.